May 12, 1970 M. E. HAMILTON 3,511,454
GYRO STABILIZATION APPARATUS
Filed Sept. 18, 1967 4 Sheets-Sheet 1

INVENTOR.
MAX E. HAMILTON
BY
Dunlap and Janey
ATTORNEYS

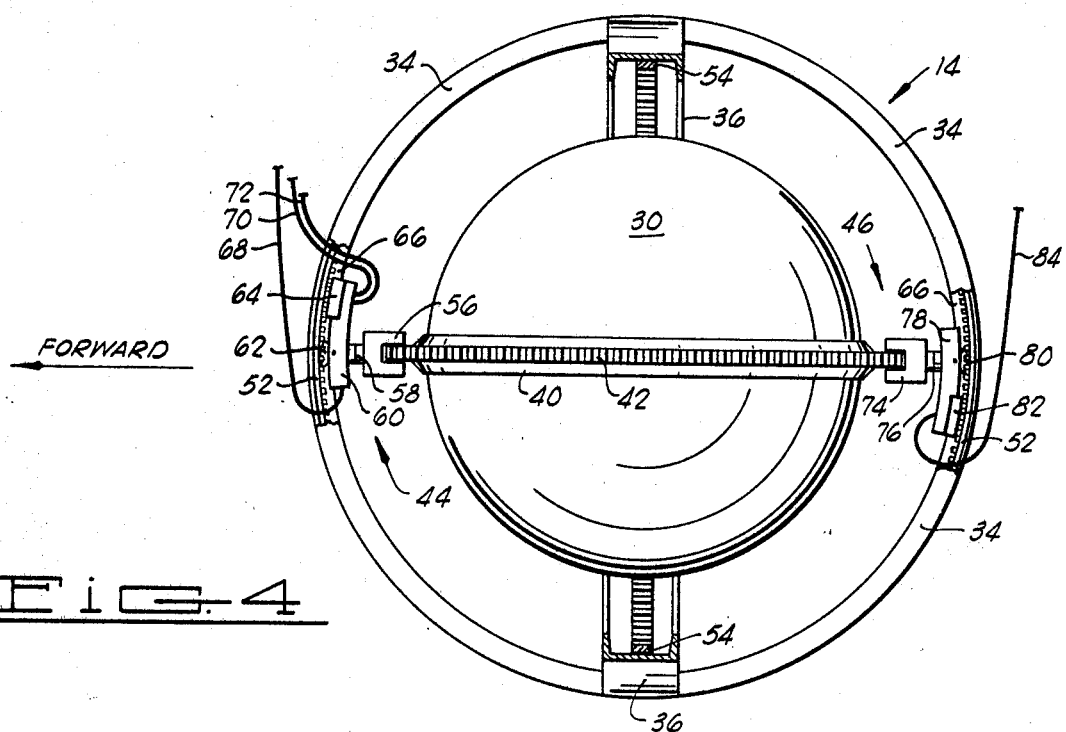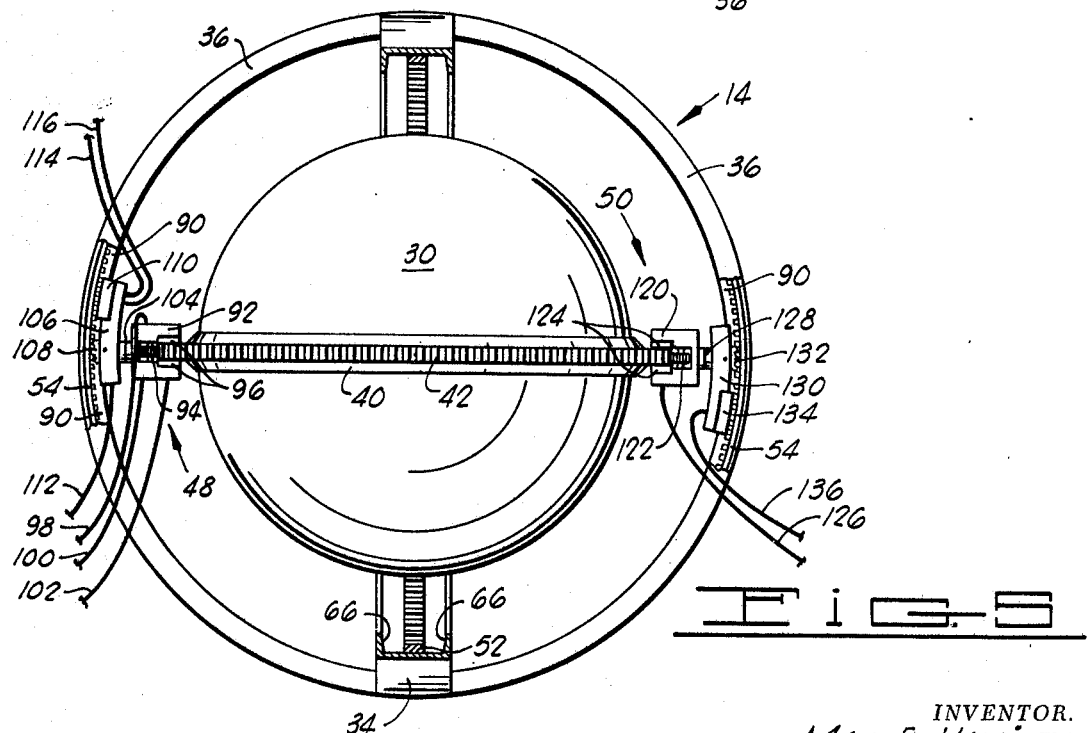

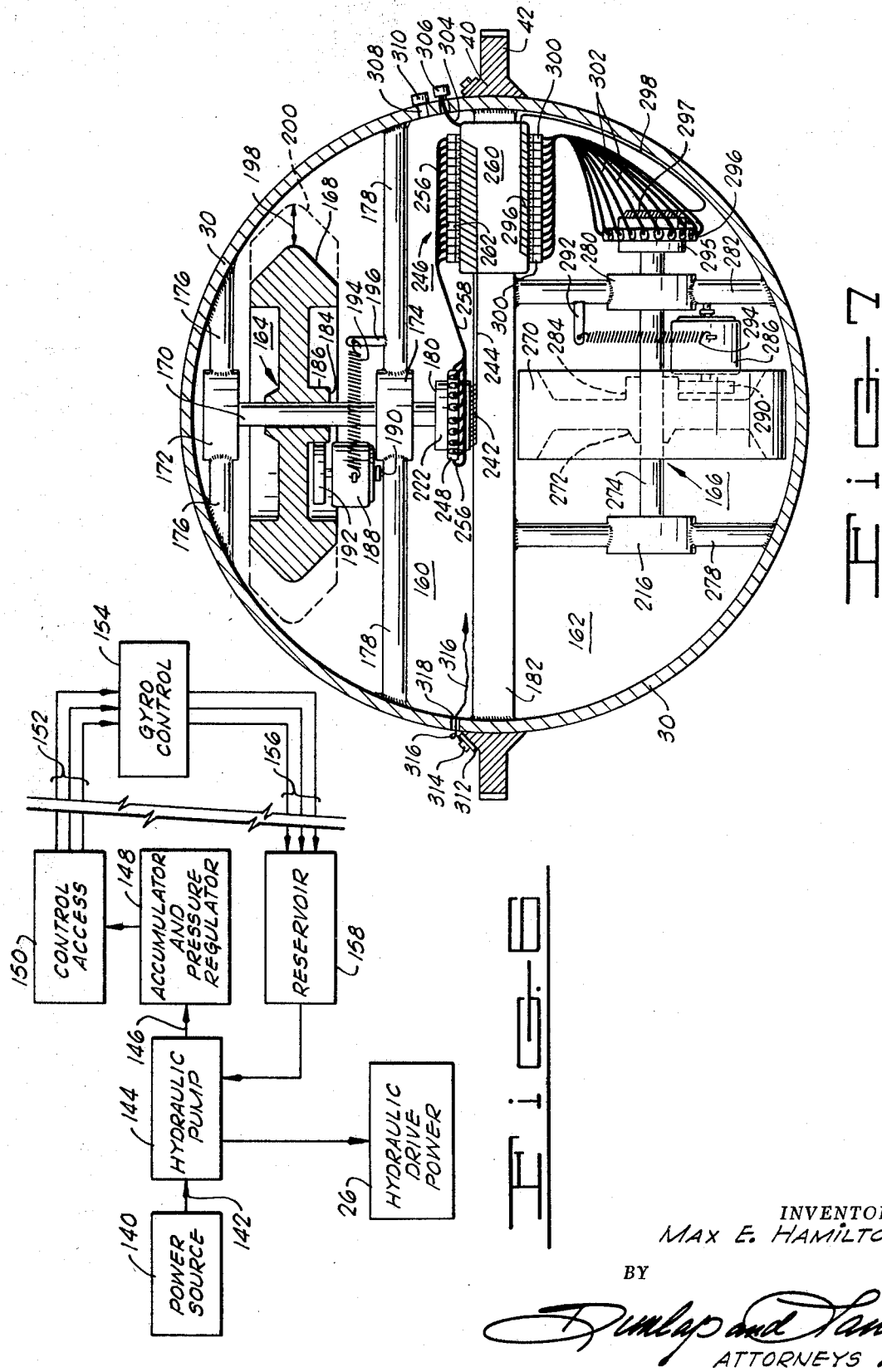

May 12, 1970 M. E. HAMILTON 3,511,454
GYRO STABILIZATION APPARATUS
Filed Sept. 18, 1967 4 Sheets-Sheet 4

INVENTOR.
MAX E. HAMILTON
BY
Dunlap and Laney
ATTORNEYS

United States Patent Office 3,511,454
Patented May 12, 1970

3,511,454
GYRO STABILIZATION APPARATUS
Max E. Hamilton, 2816 Linda Lane,
Del City, Okla. 73115
Filed Sept. 18, 1967, Ser. No. 668,500
Int. Cl. B64c 17/06
U.S. Cl. 244—79           12 Claims

ABSTRACT OF THE DISCLOSURE

A device for maintaining a body in a fixed, three-dimensional attitude. The device consisting of a chassis member having a gyro sphere controllably rotatable and movably affixed in balanced relationship thereto, the gyro sphere containing a pair of brute-force gyroscopes having their rotor axes disposed in perpendicular relationship, and also including the various drive power and control equipment. The chassis member may then be utilized to support a vehicular structure and to support operator accommodations, secondary power equipment and related machinery, and primary propulsive force may also be supplied by means of suitable drive apparatus affixed to the chassis member.

BACKGROUND OF THE INVENTION

Field of the invention

The invention relates generally to gyro stabilizing apparatus and, more particularly, but not by way of limitation, it relates to improvements in vehicular apparatus wherein complete stabilization may be obtained by operation of a brute-force gyroscope thereby to maintain a craft controllable about a fixed, spatial reference point.

Description of prior art

The prior art includes various teachings of what is termed the brute-force gyro concept wherein the rotational forces of a relatively heavy gyroscope rotor are utilized for certain stabilization functions. Mainly, such brute-force gyros have been utilized in automobiles and water-borne vessels to maintain them about a fixed horizontal plane, tending to reduce any side-to-side or fore-and-aft oscillatory movements of the vehicle or vessel, and reducing the likelihood of the craft to overturn or swamp due to its own motion. The prior teachings of such gyroscopic stabilization have relied upon the effects of a single gyroscope, or the rotational forces existent in a single plane such that only a two-dimensional point of reference is established.

SUMMARY OF THE INVENTION

The present invention contemplates a gyroscope stabilizer which is capable of providing a three-dimensional fixed reference point in space. The invention consists of a gyro device which utilizes a pair of gyroscopes having relatively heavy gyro rotors and which have their planes of rotation displaced by ninety degrees. In a more limited aspect, the gyro stabilizer apparatus may be employed in a vehicle such that the vehicle and chassis is freely and controllably movable about the gyro stabilization sphere which provides the fixed reference point in space. The gyro stabilizer is of large size such that it resists any forces tending to pivot it from a preset, three-dimensional reference position in space; and the vehicle chassis and body are controllably movable in attitude relative to the gyro stabilization sphere. Propulsion means affixed to the chassis may then provide movement of the stabilized vehicle in its fixed attitude as established and maintained by the gyro stabilizer.

Therefore, it is an object of the present invention to provide a stabilization device for establishing a fixed, three-dimensional reference position in space.

It is also an object of the invention to provide a craft which is controllable in three-dimensional attitude about three axes and which includes motive force to propel the craft.

Finally, it is an object of the present invention to provide a land/air vehicle which is capable of safe, comfortable land transportation as well as high-speed air travel and which may be propelled by conventional power and fuel sources.

Other objects and advantages of the invention will be evident from the following detailed description when read in conjunction with the accompanying drawings which illustrate the invention.

BRIEF DESCRIPTION OF THE DRAWINGS

FIG. 4 is a side view partially cut away of a gyro stabilizer and frame showing the fore-aft drive and brake assemblies;

FIG. 5 is a front view partially cut away of a gyro stabilizer and frame member showing the turn and bank drive and brake assemblies;

FIG. 6 is a block diagram of one form of control system which may be utilized in the present invention;

FIG. 7 is a view in partial section of the gyro stabilizer;

DESCRIPTION OF THE PREFERRED EMBODIMENT

Figure 1:
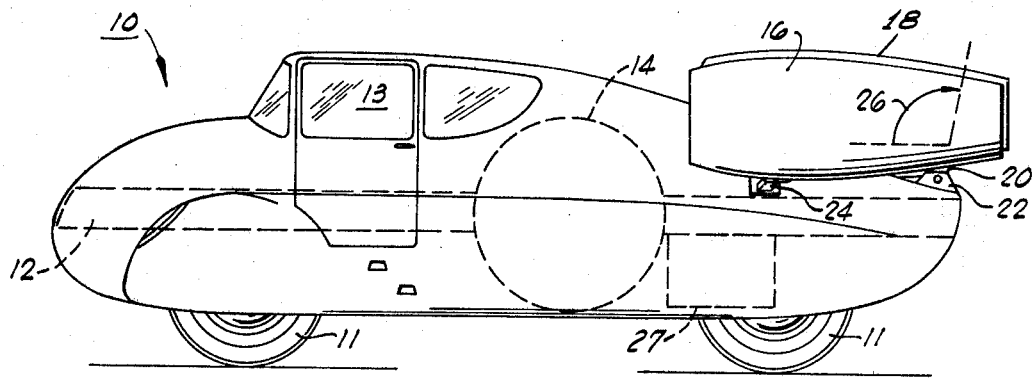
FIG. 1 is an illustration in elevation with selected internal portions shown in outline of one form of craft using gyro stabilization in accordance with the invention.

FIG. 1 illustrates the three dimensional gyro stabilizing techniques as applied to a land/air vehicle 10. The vehicle 10 supported by wheels 11 is constructed around a chassis 12, including a cockpit or cabin 13, which is secured to a gyro stabilizer 14. Primary drive power, particularly propulsion when air borne, may be derived from a twin-pod of jet engines 16 and 18 which are adjustably secured to the after end of vehicle 10. Thus, jet engines 16 and 18 may be connected together in pod form in conventional manner and a centrally affixed pivotal member 20 may be movably fastened within a pivot block 22 which is rigidly secured to the chassis 12 of vehicle 10.

Directional movement of the jet engine 16 and 18 can be effected in the fore-aft plane of the vehicle 10 by means of extendable or telescoping support bars 24. Such extension of bars 24 may be effected in conventional manner by well-known hydraulic equipment energized from the secondary power source (to be described) of the vehicle 10. Thus, extension of support bar 24 and a counterpart bar (not shown) on the other side of vehicle 10 can result in positioning of jet engines 16 and 18 anywhere from the horizontal position (as shown) to a position which is about 120° removed clockwise as shown by the dash-line angle indication 26. Recent developments in jet engines make such smaller units available for the specified purpose. Particularly, as calculated for a vehicle weighing 6400 pounds, two jets having 4500 pounds thrust, 9000 pounds thrust total, may be employed; and such jet engines for small craft utilization are commercially available from the General Electric Co. of Schenectady, N.Y. The dashed outline 27 denotes space wherein hydraulic equipment may be located. The hydraulic equipment may be of conventional form and it can be utilized both for power extension of the support bars 24 to orient jet engines 16 and 18 and to provide fluid drive in conventional manner to the rear wheels 11 of vehicle 10.

Figure 2:
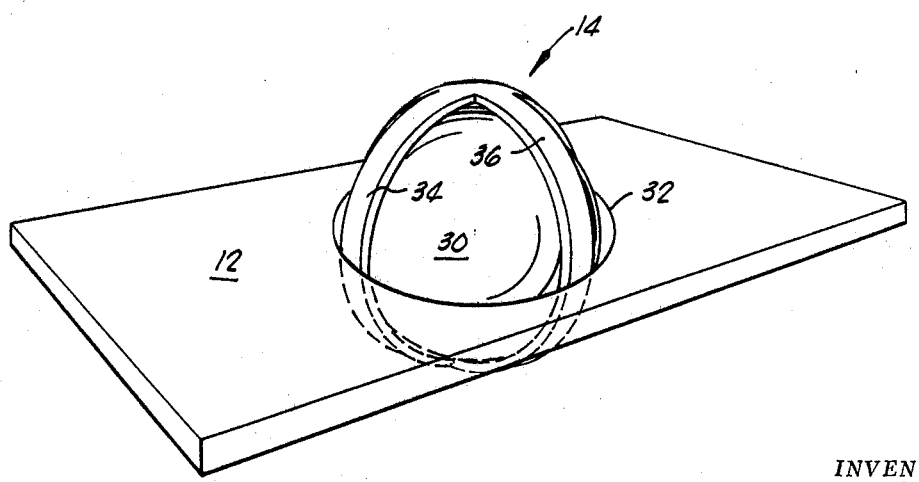
FIG. 2 is a functional diagram in perspective illustrating the relationship of a main chassis member and gyro stabilizer.

As shown in FIG. 2, the gyro stabilizer 14 is affixed in the chassis 12 in such a manner that a freely movable gyro sphere 30 is retained therein. The gyro sphere 30 is retained within an opening 32 in chassis 12 and, preferably and as shown in the drawings, the gyro sphere 30 is situated with its largest diameter or equatorial portion adjacent the inner wall of chassis opening 32. A fore/aft level control beam 34, formed as a hoop-shaped frame, is secured in fore/aft alignment along the center line of chassis 12 with diametrically opposite forward and rear edges rigidly secured to the wall of opening 32. A second hoop-shaped frame or bank control beam 36 is disposed athwart the chassis 12 having diametrically opposed sides rigidly secured to the inner wall of opening 32, and having its diametrically opposed upper and lower extremes secured as by welding to the fore/aft level control beam 34. Thus, the beams 34 and 36 form a spheroid cage within which the gyro sphere 30 is retained, the entire framing assembly being securely affixed to chassis 12.

Figure 3:
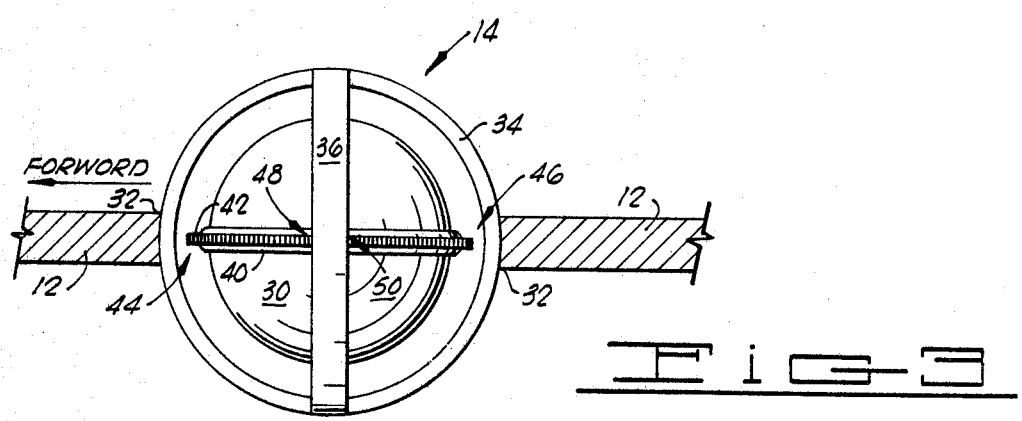
FIG. 3 is a side elevation showing the disposition and connecting points between a gyro stabilizer and a frame member in which it is movably contained.

Referring now to FIG. 3, the gyro sphere 30 is supported within the frame beams 34 and 36 in freely movable manner, thus it is also freely movable with respect to the chassis 12. A turn control beam 40 is securely affixed as by welding about an equatorial circumference of sphere 30. The turn control beam 40 is formed to extend a toothed ring gear portion 42 facing in the direction normal to the equator of sphere 30. The turn control 40 thus provides a gripping point at which sphere 30 can be contacted for the purpose of urging sphere 30 to varying three-dimensional attitudes within the gyro frame, i.e., fore/aft beam 34 and bank control beam 36. Since gyro sphere 30 contains a very forceful gyroscope, as will be described, the attitude of sphere 30 will remain the same in three-dimensional space while the relative attitude of frame beams 34 and 36 and, therefore, chassis 12, will vary with reference thereto.

A first arrow 44 denotes a point at which fore/aft adjustable connection is made between turn control beam 40 and fore/aft beam 34. A diametrically opposed position at arrow 46 provides similar adjustable affixure between turn control beam 40 and the after side of fore/aft level control beam 34. Similarly, diametrically opposed points at arrows 48 and 50 are utilized to provide turn and bank control adjustment between the bank control beam 36 and turn control beam 40. The particular types of adjustable connecting members for use at the points 44–50 which serve to support the gyro sphere 30 in freely movable manner will be further described below.

FIG. 4 shows the fore/aft adjustment mechanism which drives about the inner side of fore/aft level control beam 34. First, the level control beam 34 may be formed as an inverted U-shaped channel member similar to beam 36 shown in cutaway section. A toothed ring gear 52 is welded or otherwise secured about the inner, central portion of level control beam 34, a similar ringed gear 54 can be noted with respect to the sectional view of bank control beam 36.

The control or pivot point 44 consists of a first U-shaped bearing member 56 which is sized to ride freely but securely about the sidewalls of ring gear 42 of turn control beam 40. The geared outer surface of ring gear portion 42 does not enter into the function of bearing portion 56 as it merely guides along the side surfaces of ring gear portion 42. The bearing 56 is then connected by a swivel 58 of rugged construction which connects to a drive-brake assembly 60. The assembly 60 extends a drive gear 62 into meshing contact with ring gear 52 of level control beam 34, and a pair of brake shoes 64 are disposed on opposite sides of drive-brake assembly 60 to be brought into braking contact with the inner sidewalls 66 of the fore/aft level control beam 34.

Drive force can be imparted to drive gear 62 by any of various conventional hydraulic actuation devices, e.g. the basic gear-pump type of hydraulic drive. Thus, hydraulic pressure input on a hydraulic line 68 can be returned via hydraulic line 70 to a centrally located hydraulic power source as will be further described. Similarly, braking or outward extension of brake shoe 64 can be effected by hydraulic pressure applied through tube 72 in the manner of conventional automotive braking. It is desirable that the brake pressure on line 72 be continually applied except during those periods of drive energization for application of pressure through hydraulic lines 68 and 70, and a conventional type of four-way valve control will provide such alternative function. It is calculated that a three-sixteenths inch I.D. hydraulic line will be sufficient for both drive and braking pressure application.

A diametrically opposed pivot point 46 utilizes similar adjustably interconnecting hardware except that drive power application is not required. Thus, a bearing member 74 is disposed to ride on the turn control beam 40 in contact with the opposite sidewalls of ring gear portion 42. Bearing member 74 is then connected through a swivel 76 to a brake assembly 78. The brake assembly 78 extends a freely rotatable gear wheel 80 in contact with the ring gear 52 for following movement therealong, and it also extends oppositely disposed brake shoes 82 for extendable engagement with the inner sidewall 66 of fore/aft level control beam 34. Hydraulic braking power is applied from the central control point through hydraulic hose line 84. The hydraulic hose 84 would probably be controlled in parallel with its opposite counterpart, hydraulic brake hose 72.

As shown in FIG. 5, opposite side pivot points 48 and 50 provide adjustable connections for imparting both turn and bank relative movement between the turn control beam 40 affixed on gyro sphere 30 and the bank control beam 36. The bank control beam 36 is similar to the fore/aft level control beam 34 and includes inner channel sidewalls 90 and the ring gear 54 secured centrally about the inner diameter. The first pivot point 48 consists of a U-shaped frame member 92 which rides about the ring gear 42 of turn control beam 40, and which extends a drive gear 94 into meshing engagement with the toothed outer edge of ring gear portion 42. The frame 92 also extends oppositely disposed braking shoes 96 into engagement with the opposite sidewalls of ring gear portion 42. Energization of drive gear 94 may be effected by conventional hydraulic drive methods with application of hydraulic pressure through drive lines 98 and 100 and, alternately, braking pressure is applied through hydraulic lines 102.

The frame member 92 is then attached through a swivel 104 to a bank drive-brake assembly 106. The bank drive-brake assembly 106 extends a drive gear 108 into meshing engagement with ring gear 54 and oppositely oriented brake shoes 110 are disposed to be brought into braking engagement with the inner sidewalls 90 of bank control beam 36. Once again, hydraulic drive actuation causing rotation of drive gear 108 may be applied via hydraulic lines 112 and 114 and hydraulic braking is effected by application of pressure on hydraulic lines 116 in conventional manner.

The diametrically opposite pivot point 50 provides two degrees of following movement with braking operation which takes place simultaneously with that at pivot point 48. Thus, the turn movement is followed by a U-shaped turn frame 120 which is disposed to ride about the ring gear 42 of turn control beam 40. The frame 120 extends a gear wheel 122 in freely movable engagement with the outer edge of ring gear 42. A pair of oppositely disposed secondary brake shoes 124 are then controllable by hydraulic pressure on line 126 to bear in braking engagement against opposite sidewalls of ring gear portion 42 of turn control beam 40. The turn frame 120 is connected through a swivel 128 to the bank secondary brake assembly 130. The bank brake assembly 130 provides a freely riding gear wheel 132 in mesh with ring gear 54, as well as oppositely disposed brake shoes 134 which are operated by application of hydraulic pressure on line 136 to bear against the inner sidewalls 90 of bank control beam 36.

It should be understood that hydraulic equipment can be conserved, thereby reducing the overall weight of a craft or vehicle, by making all of the individual braking assemblies at each of pivot points 44, 46, 48 and 50 responsive to its related drive mechanism. That is, e.g., in the case of pivot point 44, the movement of drive gear wheel 62 can be employed to release the braking engagement of brake shoe 64 with channel sidewall 66 and, similarly, as at pivot point 46, movement of follower gear wheel 80 can be employed to release brake shoes 82. This simple mechanism can be applied to all of the drive and/or brake assemblies at the remaining pivot points 48 and 50.

FIG. 6 shows a conventional form of hydraulic control interconnection as might be employed in the present invention. Thus, a power source 140, a secondary power source, may be included on the chassis 12 to provide operating power. It is contemplated that a relatively small gas turbine of commercially available form will be suitable as it supplies a constant power output which can be employed to energize various equipments about such as the vehicle 10, e.g. air conditioning compressor, generator, alternators, etc. The output from power source 140 may be applied on line 142 to a main hydraulic pump 144. The main hydraulic pump 144 may be employed to energize the hydraulic drive power 26, which may take the form of conventional fluid drive or such, and it provides output via line 146 for use in driving the gyro stabilizer 14.

The hydraulic pump output on line 146 is first connected to an accumulator and pressure regulator 148, e.g. conventional types of hydraulic control equipment, and its output is then connected through control access 150. The control access 150 consists of the various valve enabling devices which may be located in the operating control station (cockpit or cabin 13 in the case of vehicle 10) and this in turn provides hydraulic energization via a multiple of lines 152 to gyro control 154. The gyro control 154 represents the various hydraulic drive and brake assemblies which are movably interconnected at the pivot points 44–50. Hydraulic pressure return from gyro control 154 is provided through the multiple pressure lines 156 for return to a hydraulic fluid reservoir 158 thus completing the cycle back to hydraulic pump 144. The hydraulic connections 152 and 156 are each shown as three line connections to denote the tertiary nature of control, i.e., the control of "fore/aft" drive and brake, "bank" drive and brake, and "turn" drive and brake in adjusting the attitude of gyro sphere 30.

FIG. 7 shows the gyro sphere 30 as it is divided into two basic sections, an upper housing 160 and lower housing 162 which contain the oppositely oriented gyroscopes 164 and 166 respectively. The upper gyroscope 164 is operated in a first or horizontal plane; that is, a rotor 168 is suitably secured for rotation with a gyro axle 170. The axle 170 is supported in resilient manner by spring blocks 172 and 174, each of which is rigidly secured by support members 176 and 178 respectively. The support members 176 and 178, here shown as a single cross member, may be employed in spaced multiples depending upon the size of the gyroscope assembly and forces generated thereby. The lower end of shaft 170 is then supported in upright but resilient mounting in a precessing block 180 which is suitably secured as by welding to the mid-frame 182 which divides the inner confines of the sphere 30.

The rotor 168 is formed to have an inner hub portion 184 which is shaped to expose a circular drive surface 186 therearound. A motor 188 is then connected through a pivotal link 190 to the support member 178 such that it can be brought into driving engagement with drive surface 186. Thus, rotational output is applied from motor 188 through a friction disc 192 to drive surface 186 thereby imparting rotation to the gyroscope rotor 168. A tension spring 194 of relatively high spring strength is connected between a post 196 secured to support member 178 and the motor 188 to continually urge the friction disc 192 into driving engagement with drive surface 186. Friction drive is found desirable in this instance since variation in the speed of motor 188 will not effect the motion of gyroscope rotor 168. The gyroscope rotor 168 can be varied as to size and, therefore, weight as denoted by the radial arrow 198 within dash lines 200, this depending upon the particular application and desired gyroscopic forces. It should be understood that there are no particular limitations to be imposed on the size and weight of the gyroscope rotors except that they be constructed with sufficient strength to withstand the rotational forces which occur at the particular rotor speeds employed.

Figure 8:
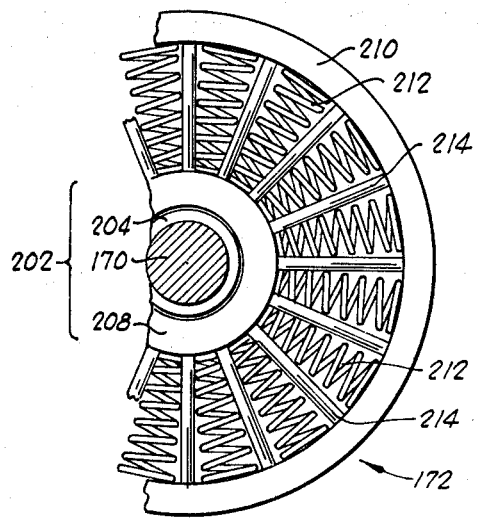
FIG. 8 is a section showing the support blocks employed in FIG. 7.
Figure 9:
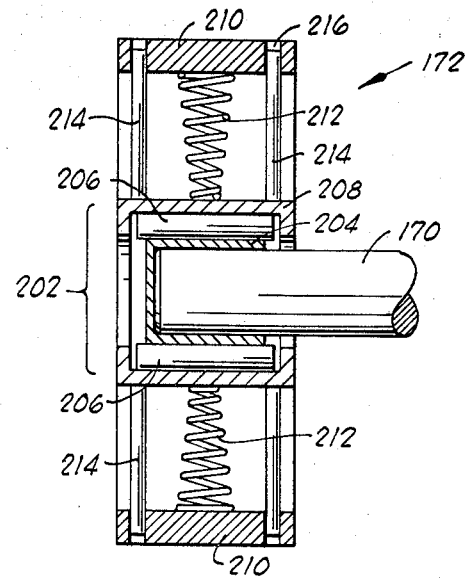
FIG. 9 is an end view of the support block shown in FIG. 8.

The support blocks 172 and 174 are shown in greater detail in FIGS. 8 and 9. The end of rotor axle 170 is received within a conventional form of roller bearing 202. The roller bearing 202 consists of an inner sleeve or end cap 204 surrounded by a plurality of rollers 206 which, in turn, rotate freely within a cylindrical frame or case 208. The bearing case 208 is then supported in resilient manner along the axis of an outer cylindrical frame 210 by means of a plurality of springs 212 and associated guide pins 214. Each of the guide pins 214 is rigidly secured as by welding to the bearing case 208 and reciprocally received within holes 216 through outer frame 210. It has been found that the use of sixteen equi-spaced springs 212 as aligned by an equal number of intersticed guide pins 214 on each side of support block 172 will provide a sufficiently rigid though resilient support which minimizes precessional movement and damps out extraneous vibrations. The support block 174 (FIG. 7) would take the same form as block 172 except that the roller bearing assembly 202 would be a type which allows extension of the rotor axle 170 through its axis, a conventional form of structure.

The precessing block 180 provides both a support block for the lower end of rotor axle 170 as well as a device for accepting and continually correcting any precessional forces generated by the gyroscope 164. Thus, and referring also to FIGS. 10 and 11, the precessing block 180 consists of an outer, cup-shaped and rigid frame 220 having cylindrical sidewalls 222. The end of rotor axle 170 is supported within a roller bearing which consists of an end cap 224, a plurality of rollers 226 and an outer bearing frame 228. Also, a thrust bearing 230 is employed to maintain the end wall of bearing cap 224 in floating position.

The bearing frame 228 is formed to have a first cylindrical extension 232 formed of relatively thin radial thickness to support each of a plurality of high-strength tension springs 234 for attachment to the cylindrical wall 222 of outer frame 220. The remaining cylindrical portion of bearing frame 228 is formed to be of substantially greater radial thickness to expose a circumferential bearing face 236 thereabout. A plurality of microswitches 238, sixteen equi-spaced switches are suitable, are placed about the inner side of cylindrical sidewall 222 of outer frame 220 such that the respective actuating extensors 240 are positioned for contact by bearing surface 236 during precessive mis-alignment as will be further described. Thus, each of the equi-spaced microswitches 238 is connected to an output lead 242 which is led through the cylindrical wall 222 of frame 220. The plurality of microswitch output leads 242 are then conducted through a multi-connection cable 244 to a hydraulic actuating assembly 246, also to be further described.

A plurality of hydraulic actuating cylinders 248 are also secured in equi-spaced relationship about the outer edge of cylindrical wall 222. Each of the hydraulic cylinders 248 are secured in pressure-tight relationship to said cylindrical wall 222 and each extends a piston 250 therethrough. A plurality of holes, for example dotted lines 252, located through cylindrical walls 222 between each of the equi-spaced microswitches 238, allow reciprocal movement of respective pistons 250 therethrough. Each of the pistons 250 is formed with a roller element 254 rotatably positioned on its inner end. The hydraulic actuating cylinders 248 can be actuated by application of hydraulic pressure on their respective hydraulic pressure application lines 256, all of the hydraulic pressure lines being conducted via a bundle or multi-hose conduit 256 as will be further described.

The springs 234 may be of relatively heavy construction such that only eight springs are required to give proper, resilient suspension to the gyroscope axle 170. It has been found that sixteen equi-spaced microswitches 238 and sixteen equi-spaced and alternated hydraulic actuators 248 and piston push-rods 250 will give sufficient control of precessional movements which are manifested as gyrations of gyroscope axle 170 about its normal or quiescent axial alignment.

Precessional control is provided from the hydraulic actuating assembly 246 (FIG. 7) which consists of hydraulic pressure chamber 260 having a plurality of exit orifices which are controlled by respective solenoid valves 262. Thus, a precessional force will result in the closure of a preselected one of the microswitches 238 such that its output on a selected electrical lead 242 through the multi-lead cable 244 will actuate a predetermined one of the solenoids 262 to energize one selected hydraulic hose 256 which, in turn, will actuate a selected one of the hydraulic actuating cylinders 248 to force its respective piston 258 into contact with the cylinder surface 236 of bearing frame 228. This contact will serve to urge the bearing frame 228 and gyroscope axle 170 in a given direction to correct for instantaneous precessional movement. It should be kept in mind, however, that precessional movement is a continual force at right angles to the plane of the torque which produces a change in direction of the gyroscope axle 170. Thus, a continuous sequential operation of hydraulic actuators 248 will take place about the circumference of the bearing frame 228 and gyroscope rotor 170 to alleviate the precessional force, that is, to continually dissipate its effect.

Referring again to FIG. 7, the lower gyroscope 166 may be constructed in nearly identical manner. Gyroscope 166 is oriented perpendicular to the upper gyroscope 164 and rotating in a plane which is athward the chassis orientation. A rotor 270, of predetermined size and weight, is formed with an inner bushing 272 which fits securely upon an axle 274 for rotation therewith. The axle 274 is held in resilient suspension at one end by a support block 276 rigidly secured by one or more support members 278, and the other end of axle 274 is resiliently supported by a support block 280, as held by one or more support members 282. The support blocks 276 and 280 may be similar to support blocks 172 and 174 (FIGS. 9 and 10) in the upper gyroscope 164. The inner bushing of rotor 270 is shaped to form a cylindrical drive surface 284, and a motor 286 pivotally secured at 288 applies rotational drive to a friction disc 290 to drive the gyroscope rotor 270. Also as previously disclosed, a supporting arm 292 and tension spring 294 apply force to motor 286 which tends to maintain the friction disc 290 in firm, driving engagement with the driving surface 284 of rotor 270.

Figure 10:
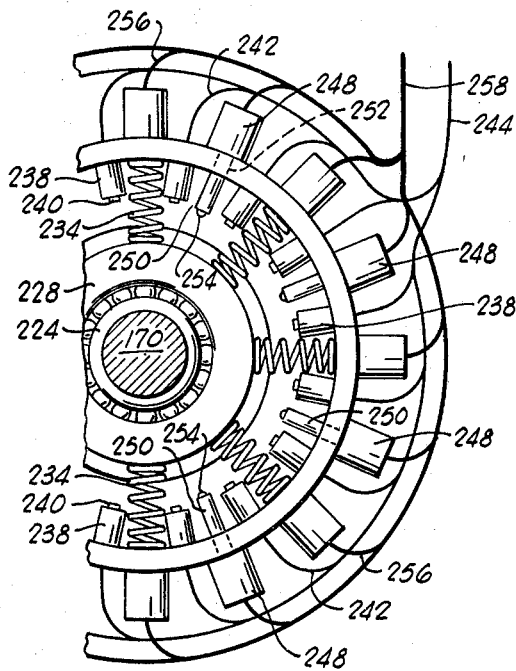
FIG. 10 is an elevational view of a precessing block as employed in the gyro stabilizer of FIG. 7.
Figure 11:
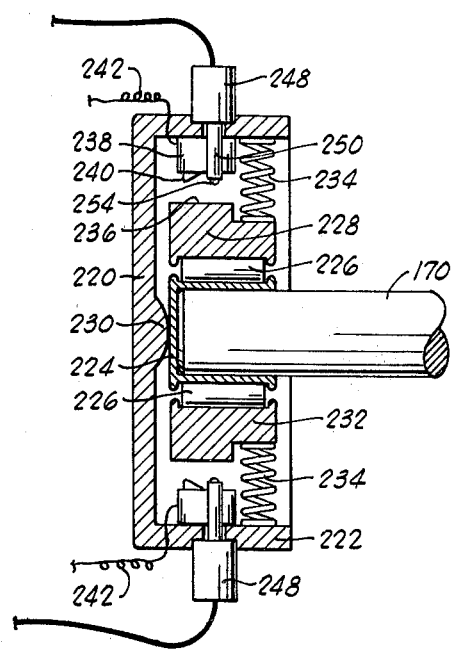
FIG. 11 is an end view of the precessing block shown in FIG. 10.

The extreme end of gyroscope axle 274 is then retained within a precessing block 295. Here again, the precessing block 295 may be constructed and controlled in similar manner to the precessing block 180 which is employed in the upper gyroscope 164 (FIGS. 10 and 11). Thus, a plurality of hydraulic actuating cylinders 296 are disposed in equi-spaced relationship about the outer circumference of precessing block 295, and although not shown, a plurality of equi-spaced internal microswitches are positioned, as shown in FIG. 11 (microswitches 238), to be actuated upon certain precessional movement of shaft 274 to provide an electrical output on one of leads 297 through multi-lead cable 298 to actuate a selected one of the solenoid valves 300.

Respective ones of the solenoid valves 300 control an exit orifice from the hydraulic pressure chamber or reservoir 260 such that pressure is applied through the hydraulic hoses 302 to a selected one of the hydraulic actuating cylinders 296 to energize it such that it exerts countering control of precessional movement of the gyroscope rotor 270.

The periodic adjustment of the hydraulic pressure within the hydraulic pressure chamber 260 can be effected through a tube connection 304 leading through a gyroscope 30 and being sealingly closed by a cap screw 306. Another orifice 308 through sphere 30 is provided for regulation of minimal air pressure within the sphere 30. Thus, in the preferred operation, the air pressure within sphere 30 is evacuated down to about 1–2 atmosphere pressure, and a screw valve 310 or such can then be sealingly affixed to close off the evacuation access hole 308.

There are several alternatives which are especially suited for application in the processing mechanisms of FIGS. 10 and 11. Thus, support blocks 172 may be constructed with a plurality of equi-spaced oil dash-pot units instead of springs 212, such alternative providing good center positioning under heavier loads. Remaining blocks 190, 216 and 280 may be similarly constructed, it is also contemplated that certain advantages may result from the use of electro-magnetic shaft correction in precessing blocks 180 and 295. This would be especially attractive for use in smaller units of compact design which experience lesser rotational forces. Thus, referring to FIG. 11 for example each of the hydraulic cylinders 248 may be replaced by an electro-magnetic actuator which may be electrically energized to extend the respective push-rod 250 into contact with bearing surface 236 to correct axial alignment of the rotor shaft 170.

The electrical power for operating the solenoid operated valves within the sphere 30 can be obtained through conventional slip ring practice. That is, a fiber insulator 312 may be secured about a canted portion of the turn control beam 40 and a conductor buss 314 may be affixed thereon. A lead 316 is then led through a sealed feed-through packing 318 for connection to the various current utilizing devices such as motors 188 and 286, microswitches 238 and similar microswitches in precessing block 292. The contact from an electric power source to buss bar 314 may be made by any conventional form of slip ring or wiper-type contactor. Although no such contactor is specifically shown, such a device could be mounted (for example) on the bearing frame 56 (FIG. 4) at pivot point 44 or, for that matter, at a similar positioning at any of the pivot points 46, 48 or 50.

OPERATION

Referring now to FIGS. 3, 4 and 5, and other figures as noted, the free floating gyro sphere 30 with its gyros running at proper speed may be viewed effectively as a reference point in space. That is, the gyro sphere 30 will tend to remain in its preset three-dimensional attitude. Such a gyro stabilizer unit constitutes a fixed gyro which employs a precession damper, the gyroscope to be of a predetermined weight and running at predetermined revolutions per mintue to stabilize or maintain a stable axis on a platform or vehicle. The weight of the platform or vehicle may be in direct proportion to the weight and r.p.m. of the gyroscope which can be varied for different applications. The stabilization forces of a gyroscope are directly related to the angular rotation; hence, it is necessary that the particular gyroscope rotor be formed with high strength to withstand very high rotational speeds. Initially, the gyro motors 286 and 188 (FIG. 7) are energized to begin rotation of the respective rotors 270 and 168 of gyroscope 166 and 164. When the gyroscopes 166 and 164 attain proper speed, the gyro sphere 30 assumes one three-dimensional attitude which is normal or proper and at which attitude no precessional forces are generated. This three dimensional reference point can then be employed to provide references for other elements which may be moved or manipulated with respect thereto. Thus, as shown in FIG. 3, the chassis 12 which is rigidly affixed to the frame comprised of fore/aft level control beam 34 and the bank control beam 36 forming a spheroid cage, can be moved by adjustment of pivot points 44, 46, 48 and 50 such that the chassis 12 and its frame are moved with respect to the gyro sphere 30.

A particular application of the gyro stabilizer is for use in a novel vehicle such as is shown in FIG. 1. In this case, the gyro sphere 30 is employed to provide a stable reference attitude for the vehicle 10; however, propulsive movements of the vehicle 10, as supplied for example by jet engines 16 and 18, may result in various torque movements upon the sphere 30 and these, in turn, will result in precessional movements of respective gyroscope rotational axles 170 and/or 274 into their vertical thrust direction, and the vehicle 10 is propelled in a generally airward direction, the brute-force gyroscope 164 will tend to maintain the vehicle 10 in a horizontal attitude but, in so doing the brute-force gyroscopic action must overcome gravity as acting on the weight of vehicle 10, as well as any forward thrust and the resistive air pressures, and each of these results in a torque force acting counterclockwise (FIG. 1) about the gyro stabilizer 14. While the gyro is designed to be of sufficient weight to stabilize against these torque forces, the precessional reaction along the axis of rotation of the gyroscope 164 must be reckoned with.

Such precessional counteraction is carried out by means of precessing block 220 in the case of upper rotor 164. Thus, a precessional force will result in a gyration of the shaft 170 such that the end of shaft 170 and the bearing frame 228 are pushed off of their axial alignment. This eccentric movement, if sufficient, will actuate one (or sometimes two) of the microswitches 238 located in the particular angular direction and, in turn, this provides electrical energization on the respective lead (or leads) 242. The electrical energization is then applied to a proper one of the solenoid control valves 262 which allows application of hydraulic pressure through a selected line (or lines) 256 to actuate one (or possibly two) of the hydraulic actuators 248 to force its respective piston 250 inward into contact with the cylindrical surface 236 of bearing frame 228 to force it inward correctively toward an axially aligned position.

The pairing up of microswitches 238 and hydraulic actuators 248 is made in a 90 degree removed relationship in keeping with the pattern of precessional response to torque motion; that is, a precessional force is a motion which is continuously at right angles to the plane of the torque producing it and, therefore, actuation of microswitches 238 should result in actuation of respective hydraulic actuators 248 which are displaced 90° counterclockwise. Such precessional correction will result in a rapid gyration of the gyroscope axle 170 such that bearing frame 228 executes repeated, eccentric revolutions consecutively actuating the microswitches 238 about the outer frame 220 and these, in turn, cause application of hydraulic fluid to successive, 90° displaced hydraulic actuators 248. The precessional forces are damped in this manner and the damping action will continue at varying intensity or gyrational speeds in proportion to the amount of torque being overcome by the gyroscope action.

In the same manner, the lower gyroscope 166 must have its precessional movements damped when it experiences torques tending to disorient the axis of rotation. Thus, any turning or banking motion of the platform associated with the gyro sphere 30 will result in some torque force being applied to the lower gyroscope 166, and it will follow that precessional gyration of gyroscope axis 274 will take place. The precessing block 292 then operates to control precessional gyration by applying centering forces 90° displaced from an eccentric positioning of the end of gyroscope shaft 274. This precessional damping is the same as was performed with respect to gyroscope 164. That is, a series of equi-spaced microswitches (not specifically shown) provides switch actuation to solenoid control valves 300 which, in turn, open selected exit orifices from the hydraulic pressure chamber 260 to actuate the hydraulic actuators 294 which serve to reposition, or urge in a corrective direction, the gyroscope axle 274.

It is also contemplated that the precession correction be carried out by other means consisting of a reference gyroscope and commutating device. Thus, a small gyroscope can be included in sphere 30 to provide a continuous electrical output indicative of variations from the reference attitude. The electrical output may then be employed to correct the attitude until a null output prevails. Such utilization of reference gyroscopes is well known in the art.

The vehicle 10 of FIG. 1 is one form of motive vehicle which can utilize the gyro stabilizer. The vehicle 10 receives primary motor power from jet engines 16 and 18; however, it is a wingless body relying solely upon the three-dimensional stabilization properties of the gyro stabilizer. The vehicle 10 is capable of alternative land operation by utilization of a portion of its secondary power source, a hydraulic power system, for driving a conventional form of fluid drive which may be connected directly to the rear wheels.

Airborne operation is effected by utilization of the jet engines 16 and 18. The jet engines 16 and 18 are controllable as to their relative direction with respect to the chassis 12 of vehicle 10. Hydraulic actuation from cockpit 13 can be employed to control the extension of telescopic support bars 24 to position the jet engines 16 and 18. Thus, engines 16 and 18 may be positioned with their reactive forces directed generally upward and, with gyro stabilizer 14 maintaining vehicle 10 horizontal, the vehicle can become airborne under the jet power. Level flight can then be gradually effected by reorienting the jet engines 16 and 18 back to a more horizontal attitude, probably about 30 to 40 degrees from the horizontal, and a complementary adjustment of chassis 12 relative to the gyro stabilizer 14 will allow a stable, forward-traveling attitude of vehicle 10 relative to the reactive drive force.

It is probably preferable that the body and various other components of the vehicle 10 be constructed from lighter materials such as fiber glass and various of the formable plastics. While this is not an absolute necessity, it brings the weight requirements of vehicle 10 within a more realistic realm as far as utilization of conventional jet or rocket power plants is concerned. It should be understood too that additional weight reduction can result, and an extremely useful and versatile vehicle can be constructed, by eliminating the wheels 11 and constructing the under portions of the body of vehicle 10 to be water-tight having the contour lines of a boat's hull. Thus, a gyro stabilized, jet-powered vehicle capable of operation on water as well as in the air will result.

Changes may be made in the combination and arrangements of elements as heretofore set forth in the specification and shown in the drawings; it being understood that changes may be made in the embodiments disclosed without departing from the spirit and scope of the invention as defined in the following claims.

What is claimed is:

1. A motive vehicle which is adapted for plural modes of movement including heavier-than-air flight, comprising:
   a gyro stabilizer means energized to operate in a preset spatial attitude thereby to provide a three dimensional fixed point of reference;
   chassis means;
   frame means secured to said chassis means in a midportion of said chassis means;
   first, second and third connecting means movably securing said gyro stabilizer means within said frame means, each of said first, second and third means providing drive and brake control for positioning said frame means with respect to the gyro stabilizer means in a different one of three spatial dimensions; and
   means connected to said chassis means to provide motive power to propel said motive vehicle in a given direction relative to said three-dimensional, fixed point of reference.

2. A motive vehicle as set forth in claim 1 wherein said gyro stabilizer means comprises:
   housing means in the form of a hollow sphere;
   a turn control means secured about the equator of said housing means and extending perpendicularly to the tangent about said equator;
   first gyroscope means secured within the upper hemisphere of said housing means to rotate in a plane parallel to said turn control means;
   first drive means for applying rotational motion to said first gyroscope;
   second gyroscope means mounted within the lower hemisphere of said housing means for rotation in a plane perpendicular to the plane of said turn control means; and
   second drive means connected to impart rotational motion to said second gyroscope.

3. A motive vehicle as set forth in claim 1 wherein said frame means comprises:
   a fore-aft level control means in the form of a circle and mounted in said chassis means at opposite diametric points, said level control means being mounted so that its plane is perpendicular to said chassis means;
   a bank control means also being circular in shape, having opposite diametric points secured to said chassis means and being disposed such that the bank control means plane is perpendicular to the plane of said fore-aft level control means and secured thereto in crossed relationship to form a spherical frame.

4. A motive vehicle as set forth in claim 2 wherein said frame means comprises:
   a fore-aft level control means in the form of a circle and mounted in said chassis means at opposite diametric points, said level control means being mounted so that its plane is perpendicular to said chassis means;
   a bank control means also being circular in shape, having opposite diametric points secured to said chassis means and being disposed such that the bank control means plane is perpendicular to the plane of said fore-aft level control means and secured thereto in crossed relationship to form a spherical frame.

5. A motive vehicle as set forth in claim 4 wherein said three connecting means comprise:
   first drive-brake means movably connecting said turn control means to said fore-aft level control means to move said turn control means relative to said fore-aft level control means;
   first secondary brake means connecting the diametrically opposite side of said turn control means to said fore-aft level control means;
   second drive-brake means connected to said bank control means for relative movement thereto;
   second secondary brake means connected to move about the diametricaly opposite side of said bank control means;
   third drive-brake means pivotally connected to said second drive-brake means and being engaged with said turn control means to move it relative to said bank control means; and
   third secondary brake means pivotally connected to said second secondary brake means and being disposed at the diametrically opposite side of said turn control means and movably secured thereto.

6. A motive vehicle as set forth in claim 5 which is further characterized to include:
   a hydraulic power source;
   control means energized by said hydraulic power source to control said first, second and third drive-brake means and said first, second and third secondary brake means; and
   control access means disposed in said motive vehicle for controlling said control means and hydraulic power source.

7. A motive vehicle as set forth in claim 6 wherein said means to propel said vehicle comprises:
   jet engine means connected to said motive vehicle and being controllable as to orientation relative to said chassis means to vary the direction of motive vehicle propulsive thrust.

8. A motive vehicle as set forth in claim 2 wherein said first and second gyroscope means each comprise:
   gyroscope rotor means;
   a gyroscope shaft means having said rotor means affixed at a mid-point therealong;
   a pair of support block means supporting said shaft means on each side of said rotor means in nonrigid, radially movable manner;
   precessing block means supporting one end of said shaft means in radially movable manner; and
   counteractive means for urging said shaft means in a radial direction to oppose precessive movement generated by torque forces acting upon said gyroscope rotor and shaft.

9. Apparatus for providing a three-dimensional reference point in space, comprising:
   a gyro stabilizer means energized to operate in a preset spatial attitude thereby to provide a three dimensional fixed point of reference;
   reference chassis means;
   frame means secured to said chassis means in a midportion of said chassis means;
   first, second and third connecting means movably securing said gyro stabilizer means within said frame means, each of said first, second and third means providing drive and brake control for positioning said frame means with respect to the gyro stabilizer means in a different one of three spatial dimensions;
   first power source means disposed within said gyro stabilizer means to provide operating energization thereto; and
   second power source disposed proximate said frame means to provide energization to said first, second and third means providing drive and brake control.

10. An apparatus as set forth in claim 9 wherein said gyro stabilizer means comprises:
    housing means in the form of a hollow sphere;
    a turn control means secured about the equator of said housing means and extending perpendicularly to the tangent about said equator;
    first gyroscope means including a gyroscope rotor and shaft mounted in one hemisphere of said housing means;
    motor means mounted in said hemisphere and energized by said first power source means to impart rotation to said rotor;

supporting means holding said gyroscope shaft for rotational movement in a plane parallel to said turn control means;

precession control means movably secured to one end of said gyroscope shaft to continually counter precessive movements;

second gyroscope means including a second gyroscope rotor and shaft mounted in the second hemisphere of said housing means;

motor means mounted in said second hemisphere and energized by said rotational movement to said gyroscope rotor;

support means for holding said second gyroscope rotor within the second hemisphere of said housing means for rotation in a plane perpendicular to the plane of said turn control means; and precession control means for countering precessive movement of said second gyroscope shaft.

11. An apparatus as set forth in claim 10 wherein said frame means comprises:

a fore-aft level control means in the form of a circle and mounted in said reference chassis means at opposite diametric points, said level control means being mounted so that its plane is perpendicular to said chassis means; and a bank control means also being circular in shape, having opposite diametric points secured to said chassis means and being disposed such that the bank control means plane is perpendicular to the plane of said fore-aft level control means and secured thereto in crossed relationship to form a spherical frame.

12. An apparatus as set forth in claim 11 wherein said first, second and third connecting means comprise:

first drive-brake means movably connecting said turn control means to said fore-aft level control means to move said turn control means relative to said fore-aft level control means;

first secondary brake means connecting the diametrically opposite side of said turn control means to said fore-aft level control means;

second drive-brake means connected to said bank control means for relative movement thereto;

second secondary brake means connected to move about the diametrically opposite side of said bank control means;

third drive-brake means pivotally connected to said second drive-brake means and being engaged with said turn control means to move it relative to said bank control means; and third secondary brake means pivotally connected to said second secondary brake means and being disposed at the diametrically opposite side of said turn control means and movably secured thereto.

References Cited

UNITED STATES PATENTS

| | | | |
|---|---|---|---|
| 2,158,180 | 5/1939 | Goddard | 244—79 |
| 2,183,314 | 12/1939 | Goddard | 244—79 |
| 3,006,581 | 10/1961 | Langman | 244—79 |
| 3,189,299 | 6/1965 | Garner et al. | |

ANDREW H. FARRELL, Primary Examiner

U.S. Cl. X.R.

180—1